United States Patent
Tryon et al.

(10) Patent No.: US 7,223,202 B2
(45) Date of Patent: *May 29, 2007

(54) HYDRAULIC CIRCUIT FOR TORSIONAL DAMPER ASSEMBLY OF AN ELECTRICALLY VARIABLE TRANSMISSION

(75) Inventors: Eric S. Tryon, Indianapolis, IN (US); Joel E. Mowatt, Zionsville, IN (US); Kenneth D. Schoch, Greenwood, IN (US)

(73) Assignee: General Motors Corporation, Detroit, MI (US)

( * ) Notice: Subject to any disclaimer, the term of this patent is extended or adjusted under 35 U.S.C. 154(b) by 164 days.

This patent is subject to a terminal disclaimer.

(21) Appl. No.: 11/063,329

(22) Filed: Feb. 22, 2005

(65) Prior Publication Data

US 2005/0205381 A1    Sep. 22, 2005

Related U.S. Application Data

(60) Provisional application No. 60/555,141, filed on Mar. 22, 2004.

(51) Int. Cl.
*B60W 30/20* (2006.01)
*F16D 3/14* (2006.01)

(52) U.S. Cl. .................. 477/5; 475/5; 192/55.61; 192/70.17; 192/201; 192/212; 192/106 F

(58) Field of Classification Search .......... 192/201
See application file for complete search history.

(56) References Cited

U.S. PATENT DOCUMENTS

| | | | | |
|---|---|---|---|---|
| 3,296,887 A | * | 1/1967 | Larsen | 464/68.41 |
| 3,380,566 A | * | 4/1968 | Cook | 192/213 |
| 3,863,746 A | * | 2/1975 | Schulz | 192/106 F |
| 4,624,351 A | * | 11/1986 | Lutz et al. | 192/48.5 |
| 5,009,301 A | | 4/1991 | Spitler | 192/106.2 |
| 5,513,732 A | * | 5/1996 | Goates | 192/3.3 |
| 5,558,589 A | * | 9/1996 | Schmidt | 475/5 |
| 6,332,521 B1 | * | 12/2001 | Shoji | 192/55.61 |
| 6,361,287 B1 | | 3/2002 | Hopper | 417/286 |
| 2005/0205379 A1 | * | 9/2005 | Tryon et al. | 192/70.17 |
| 2005/0205382 A1 | * | 9/2005 | Tryon et al. | 192/214 |

FOREIGN PATENT DOCUMENTS

| EP | 1027224 B1 | | 1/2002 |
|---|---|---|---|
| EP | 1396368 A2 | * | 3/2004 |
| JP | 200161437 | | 6/1990 |

* cited by examiner

*Primary Examiner*—Richard M. Lorence
(74) *Attorney, Agent, or Firm*—Christopher DeVries

(57) ABSTRACT

The present invention relates to a torsional damper for an electrically variable transmission. The torsional damper is equipped with a hydraulically actuable lock-out clutch to selectively directly couple the engine to the input shaft of the transmission. The electric motors provided with the electrically variable transmission can serve to effectively cancel out engine compression pulses when the springs of the torsional damper are locked out. During higher speeds the centrifugal loading placed on oil in the torsional damper increases, which may cause the lock-out clutch to inappropriately engage. The present invention hydraulically balances the hydraulic actuator (or piston) driving the lock-out clutch to appropriately regulate lock-out clutch engagement.

18 Claims, 2 Drawing Sheets

HYDRAULIC CIRCUIT FOR TORSIONAL DAMPER ASSEMBLY OF AN ELECTRICALLY VARIABLE TRANSMISSION

CROSS-REFERENCE TO RELATED APPLICATIONS

This application claims the benefit of U.S. Provisional Application 60/555,141 filed Mar. 22, 2004, which is hereby incorporated by reference in its entirety.

TECHNICAL FIELD

The present invention relates to an electrically variable transmission with a torsional damper assembly having a hydraulically balanceable lock-out clutch assembly.

BACKGROUND OF THE INVENTION

Automobile engines produce torsionals or vibrations that are undesirable to transmit through the vehicle transmission. To isolate such torsionals, torsional dampers can be implemented into the vehicle transmission. These dampers rest between the engine crankshaft and the input shaft or turbine shaft of the transmission to substantially counteract the unwanted torsionals generated by the engine. Dampers are configured with springs that have the capacity to carry maximum engine torque plus some margin above.

One premise behind hybrid automobiles is that alternative power is available to propel the vehicle, thus reliance on the engine for power can be decreased, thereby increasing fuel economy. Since hybrid vehicles can derive their power from sources other than the engine, hybrid engines typically operate at lower speeds more often and can be turned off while the vehicle is propelled by the electric motors. For example, electrically variable transmissions alternatively rely on electric motors housed in the transmission to power the vehicle's driveline. Engines in hybrid vehicles are therefore required to start and stop more often than engines in non-hybrid systems. Compression pulses are generated by the engine during starts and stops that can produce undesirable vibration in hybrid vehicles such as those having an electrically variable transmission. Therefore, greater functionality is desirable in the damper assembly to aid the electrically variable transmission in canceling these compression pulses.

Lastly, since the torsional damper assembly is securable to the engine crankshaft the torsional damper revolves at high annular speeds. Where hydraulic fluid is used to govern the torsional damper, the fluid is subjected to centrifugal loading as a result of these annular speeds.

SUMMARY OF THE INVENTION

The present invention provides a means of hydraulically balancing the actuator (or piston) driving a lock-out clutch for the torsional damper assembly of an electrically variable transmission (or EVT). The invention includes two separate hydraulic circuits transferring a hydraulic fluid to opposing sides of the piston when necessary to balance the piston. The need for this balancing depends upon the centrifugal loading placed on the hydraulic fluid resulting from the annular speed of the damper assembly.

In one embodiment of the present invention, each circuit is in parallel with two pumps (one motor driven and the other engine driven) to assist in supplying the hydraulic fluid to the intended areas of the torsional damper assembly.

More specifically, the present invention provides an electrically variable transmission with at least one electric motor and a rotatable torsional damper assembly. The torsional damper assembly includes a torsional spring operable to eliminate or reduce compression pulses and torsionals. A clutch assembly is further provided, having a hydraulically operable piston for selectively locking out the torsional spring; whereas at least one electric motor cancels out compression pulses when the torsional spring is locked out. Also included is a hydraulic fluid applicable to opposing sides of said piston to sufficiently hydraulically balance the piston so as to prevent the clutch assembly from locking out the torsional spring at least partially in response to centrifugal forces resulting from the rotational speed of the damper.

Also provided is a method of operating a rotatable hydraulically actuated torsional damper of an electrically variable transmission in the start, stop and drive modes. The method includes hydraulically locking out the torsional damper during the start and stop modes with hydraulic fluid; and hydraulically counter balancing the lockout piston of the torsional damper to prevent the hydraulically locking out of the torsional damper during drive mode.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
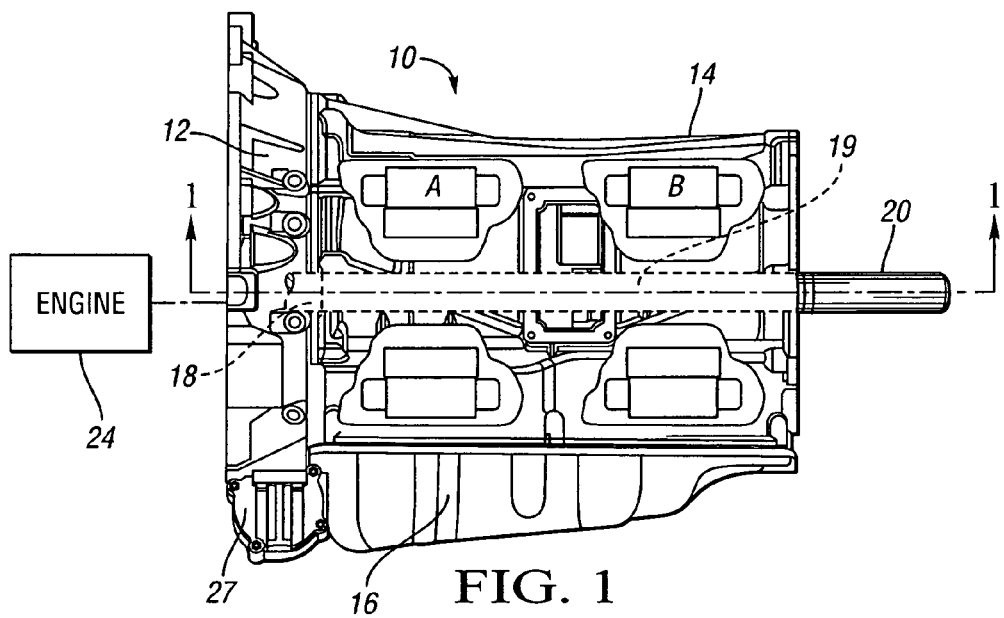
FIG. 1 is a schematic side view of an electrically variable transmission with parts broken away to show selected transmission components and an auxiliary pump mounted to the transmission.
Figure 2:
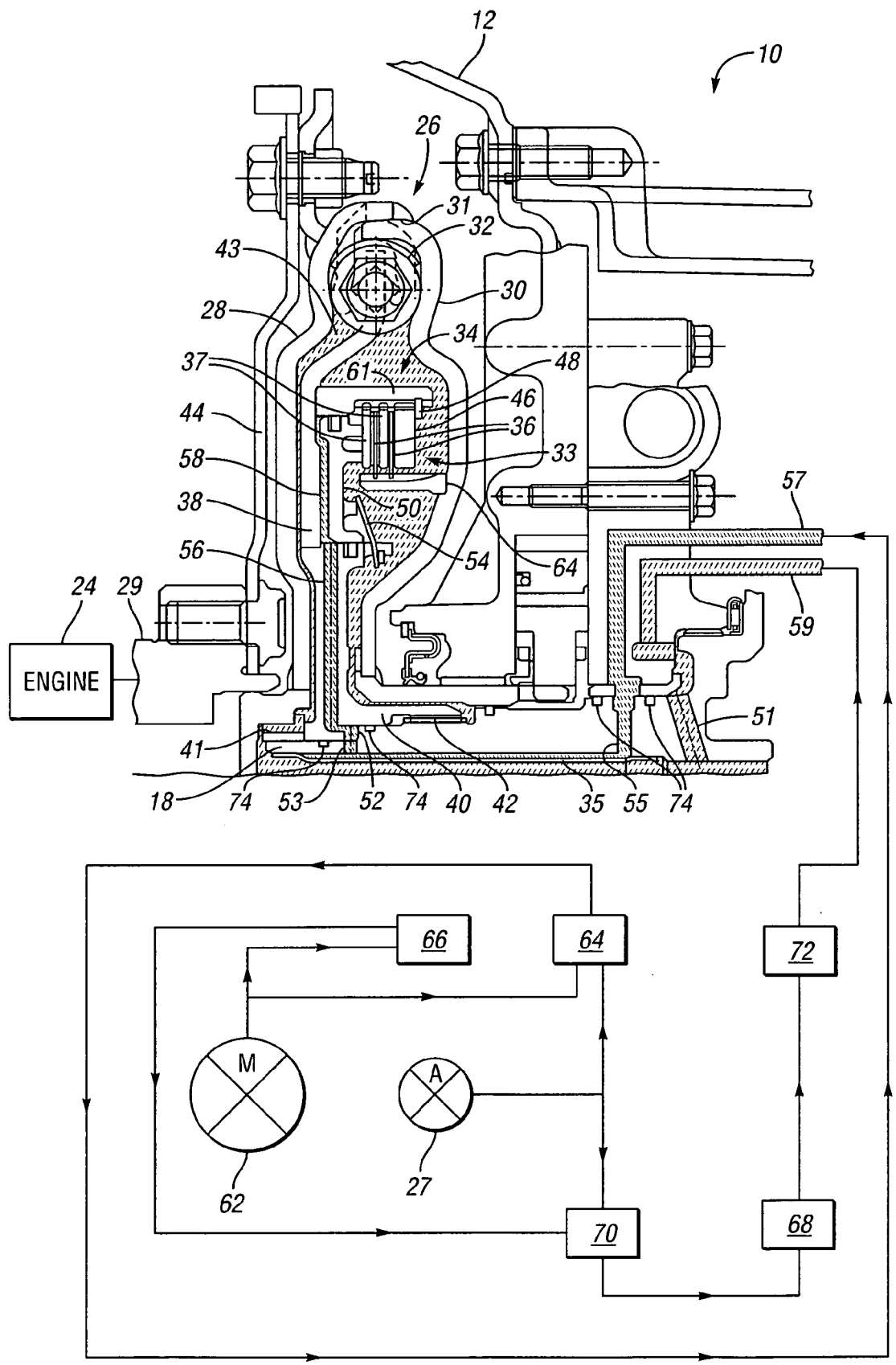
FIG. 2 is a fragmentary cross-sectional view of the torsional damper assembly taken along one side of the centerline of the front portion of the electrically variable transmission with two hydraulic circuits shown schematically.

Referring to the drawings, FIGS. 1 through 2, wherein like characters represent the same or corresponding parts throughout the several views there is shown in FIG. 1 a side view of an electrically variable transmission 10. Fundamentally, the present invention is implemented in an electrically variable transmission 10 with at least one electric motor (A or B) and a rotatable torsional damper assembly 26, as shown in FIG. 2. The torsional damper assembly 26 includes a torsional spring 32 operable to eliminate or reduce compression pulses and torsionals. A clutch assembly (or lockout clutch 33) is further provided, having a hydraulically operable piston 50 for selectively locking out the torsional spring 32; thereby enabling one or both of the electric motors (A or B of FIG. 1) to cancel out engine compression pulses. Also included is a hydraulic fluid which is applicable to the piston cavity 58 and the damper vessel 34, which are on opposing sides of the piston 50, to sufficiently hydraulically balance the piston 50 so as to prevent the lock-out clutch 33 from locking out the torsional spring 32 as a result of centrifugal forces from the rotation of the torsional damper 26.

More specifically, FIG. 1 displays selected components of an electrically variable transmission 10 including the input housing 12 and main housing 14 with dual electric motors (A and B), which are indirectly journaled onto the main shaft 19 of the transmission 10 through a series of planetary gear set (not shown). The motors (A, B) operate with selectively engaged clutches (not shown) to rotate the output shaft 20. The oil pan 16 is located on the base of the main housing 14 and is configured to provide oil volume for the transmission 10 and its components. The main housing 14 covers the inner most components of the transmission such as the electric motors (A, B), planetary gear arrangements, the main shaft 19 and two clutches (all of which are mentioned for exemplary purposes and not all are shown). Finally, the input housing 12 is bolted directly to the engine block rear face of the engine 24 (schematically represented in FIG. 2) and encases the transmission components that mechanically interface with the engine 24. Namely, the input housing 12 covers the torsional damper assembly 26 (shown better in FIG. 2). The input housing 12 also supports an auxiliary pump 27 (as shown in FIG. 1), which is mounted to the base of the input housing 12 and secured nestably adjacent the oil pan 16.

The torsional damper assembly 26, as shown in FIG. 2, generally functions to isolate the transmission 10 from unwanted torsionals generated by the engine 24 during operation and also to selectively aide the transmission electric motors (either A or B) in canceling engine compression pulses during starts and stops. The torsional damper assembly 26 consists of an engine side cover 28, which is affixed to the engine crankshaft 29. The engine side cover 28 is welded to the transmission side cover 30 at 31 and houses the damper springs 32. The two covers (28 and 30) define a vessel 34, which encloses the lock-out clutch 33 and a piston 50. The torsional damper assembly 26 further houses a damper flange 38 with hub portion 40 that mates to the input shaft 18 at complementary splines 42. The engine side cover 28 of the torsional damper assembly 26 is affixed to an engine flexplate 44. The flexplate 44 functions to transmit to the transmission the torque produced by the engine 24 and also to absorb any thrust loads generated by the damper assembly 26. The torsional damper assembly 26 consists of a series of damper springs 32 running annularly or circumferentially between the engine side cover 28 and transmission side cover 30. The damper springs 32 absorb and dampen the unwanted torsionals produced by the engine 24 during normal or drive mode operation (i.e., speeds above 600 rpm). The torsional damper assembly 26 has a torque capacity equal to the maximum torque capacity of the engine plus some margin. The torsional damper assembly 26 may be configured, in part, similarly to the structure disclosed in commonly owned, U.S. Pat. No. 5,009,301, which is hereby incorporated by reference in its entirety.

The electrically variable transmission 10 is equipped with two electric motors (A and B as shown in FIG. 1). Electric motor A creates a torque during start and stop that effectively cancels out the engine compression pulses caused when the engine is operating at speeds below 600 rpm (or in start and/or stop mode). The damper springs 32 of the torsional damper assembly 26 can be locked out by applying the clutch plates 36 and 37 (of the lock-out clutch 33) when the engine 24 is operating within a predetermined speed range. In the preferred embodiment, the torsional damper assembly 26 is effectively locked out when the engine is operating at speeds less than or equal to 600 rpm. This mode of operation is desirable because in an electrically variable transmission either electric motor (A or B) can be used to actively cancel out engine compression pulses generated during start or stop. The lock-out clutch 33, located inside the torsional damper assembly 26, consists of two reaction plates 37 connected to the damper flange 38, two friction plates 36 connected to the transmission side cover 30, a backing plate 46 and a snap ring 48 that is attached to the damper flange 38 at arm 61. The lock-out clutch 33 is adjacent a hydraulic piston 50 which moves against the reaction plates 37 forcing them to engage the friction plates 36. The piston 50 moves in response to oil fed into cavity 58 from an oil circuit 57. The load is reacted at the backing plate 46 and snap ring 48 and contained by the damper flange 38. Adjacent the piston 50 and affixed to the damper flange 38 is the damper hub 40 of the torsional damper assembly 26, which has a cross-drilled channel 56 to define a radially extending aperture 52 that allows oil from circuit 57 to pass through. The oil extends through a cross-drilled aperture 55 in the input shaft 18 through aperture 53, into the channel 56 to the front side of the piston 50. The piston 50 is restricted from engaging with the lock-out clutch 33 and held in the disengaged position by a return spring 54. As oil is fed through channel 56 of the damper hub 40, the pressure inside the piston cavity 58 increases creating a load sufficient to overcome the spring force and stroke the piston 50 thereby engaging the lock-out clutch 33. The vessel 34 is also filled with oil from the hydraulic circuit 59, through aperture 51, into the inner diameter of tube 35, which is fitted in the input shaft 18, through a grooved thrust washer 41 (or bushing), into cavity or spacing 43 and to the interior of vessel 34. The oil thus received in vessel 34 is on the right side of the piston 50, as shown in FIG. 2, to counter balance the oil fed into cavity 58 on the other side of the piston 50.

The hydraulic circuits 57 and 59, as shown in FIG. 2, supply oil to the piston cavity 58 and damper vessel 34 respectively; governing the lock-out clutch 33 and commanding it to engage and disengage under certain predetermined conditions. The first circuit 57 delivers hydraulic fluid to the piston cavity 58. The second circuit 59 is regulated at a lower pressure and ultimately sends oil to the vessel 34 located on another side of the piston 50. The piston 50 inside the torsional damper assembly 26 responds to the sufficiently higher pressure resulting from the oil fed through the first circuit 57 by stroking and engaging the lock-out clutch 33 to effectively lock out the damper springs 32. When the lock-out clutch 33 is engaged the torsional damper springs 32 are deactivated or locked out so that the engine 24 is directly coupled to the input shaft 18 of the transmission 10. This condition is only preferred for engine starts and stops (i.e., start and/or stop modes where engine speeds are within the predetermined speed range: between 0 and 600 rpm).

Figure 3:
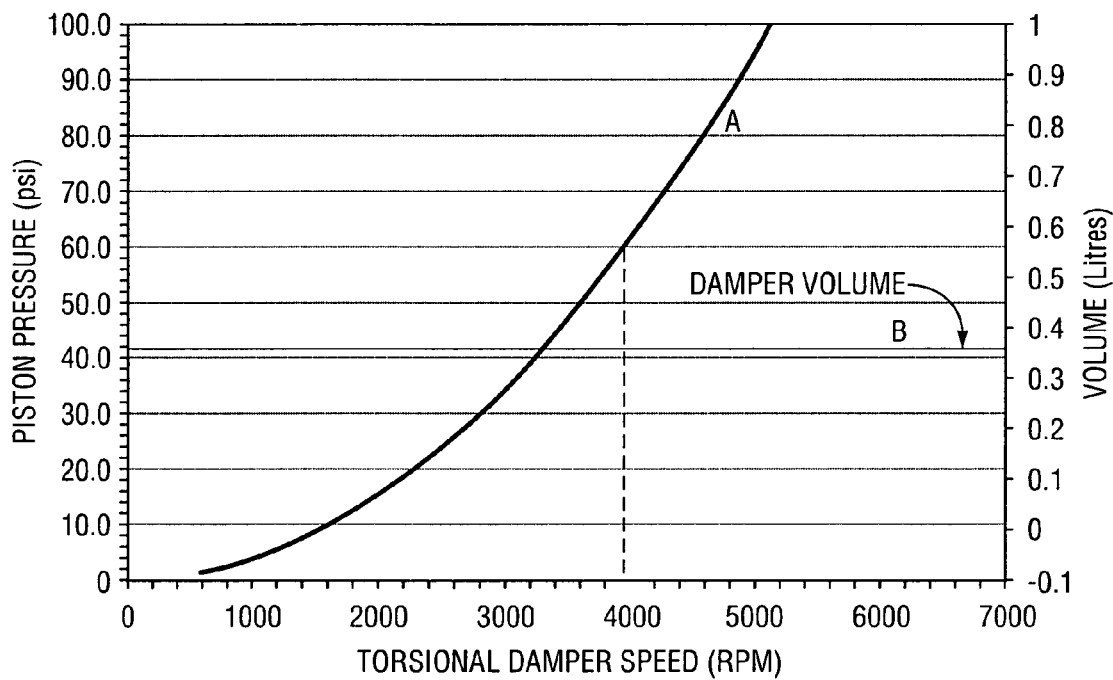
FIG. 3 is a graph indicating the piston charging pressure as a function of the damper assembly speed (line A) and the damper vessel volume required to balance the piston (line B).

The transmission 10 can operate in electric mode where the engine 24 is completely turned off. When the engine is off the main pump 62, which derives its power from the engine, is inoperable. Since the damper vessel 34 is unsealed the oil inside drains from the damper vessel 34 to approximately half full when the main pump 62 and the auxiliary pump 27 are not in operation. As the engine is restarted, the remaining oil is forced to the perimeter of the torsional damper assembly 26 by the centrifugal loading resulting from the revolution of the input shaft 18 and torsional damper assembly 26. Likewise, the oil remaining in the damper hub 40 is forced into the piston cavity 58 (i.e., its perimeter). Since the oil in the damper flange 38 is concentrated in the piston cavity 58 the oil in the piston cavity 58 weighs on the piston 50. At high speeds the centrifugal loading on the oil (or hydraulic fluid) in the piston cavity 58 may overcome the force of the return spring 54 and stroke the piston 50. To stroke the piston 50 the pressure difference between the piston cavity 58 and the damper vessel 34 must be greater than or equal to 4 psi to overcome the return spring and greater than or equal to 60 psi to acquire full capacity on the clutch 33. Line A of FIG. 3 illustrates the increased pressure differential of the oil in the piston cavity 58 as a function of the speed of the torsional damper assembly 26. The x-axis represents the speed of the torsional damper assembly 26 and the y-axis represents the charging pressure on the piston 50. As the torsional damper assembly speed approaches 4000 rpm the charging pressure resulting from the hydraulic fluid in the piston cavity 58 is approximately 60 psi—enough to have full torque design capacity on the clutch 33. Inappropriate engagement of the lock-out clutch 33 and effectively locking out of the torsional damper assembly 26 can lead to additional wear on transmission components causing premature failure or reduced cycle life. However, as demonstrated by the intersection of lines A and B in FIG. 3, when using the provided pumps (27 and 62) to fill the damper vessel 34 the piston 50 can be hydraulically balanced prior to reaching a charging pressure of 60 psi. Though either pump is capable of supplying oil into the damper vessel 34, the auxiliary pump 27 is responsible for sending oil to the vessel 34 or other side of the piston 50 when the transmission is operating in electric mode (or when the engine is off).

One of the technical advantages of the present invention is that the hydraulic circuits, 57 and 59 as shown in FIG. 2, and pumps 27 and 62 are configured to balance the hydraulic piston 50 in preparation for engine operation. To balance the piston 50 at least 0.36 liters of oil must be inside the damper vessel 34 as shown by line B in FIG. 3. When the auxiliary pump 27 is operating it pulls oil from a sump and sends oil in parallel to the control module 64 and the priority regulator 70 (as shown in FIG. 2). The priority regulator 70 regulates the pressure at which the auxiliary pump 27 operates (which is 60 psi in the preferred embodiment) and directs all excess oil to the thermal exchanger 68 which returns oil to the transmission 10, through the lube regulator 72 and into hydraulic circuit 59. The control module 64, under certain predetermined conditions (or in start and/or stop modes of operation in the preferred embodiment), will supply oil to hydraulic circuit 57 to pressurize the oil in the piston cavity 58 up to 110 psi. When the engine is on and turning the main pump 62 pulls oil from the sump and sends it in parallel to the control module 64 and main regulator valve 66. From the main regulator 66, oil passes through the priority regulator 70, flows through the thermal exchanger 68 to lube regulator 72 and into hydraulic circuit 59.

In the preferred embodiment, the lube regulator 72 ensures that the pressure of the oil in the damper vessel 34 does not exceed 30 psi. The control module 64 maintains oil pressure in the hydraulic circuit 57 to 2 psi. Therefore, the piston 50 cannot stroke to apply the clutch 33 with the oil in the piston cavity 58 at 2 psi, the oil in the damper vessel 34 at 30 psi, and the return spring 54 applying an adverse load. The piston 50 is thereby hydraulically balanced or prevented from engaging the lock-out clutch 33. However, when desirable (or in start and/or stop modes of operation), the auxiliary pump 27 can apply the clutch 33 by supplying high-pressure oil to the piston cavity 58 overcome the 30 psi in the damper vessel 34 and the adverse force of the return spring 54.

Figure 4A:
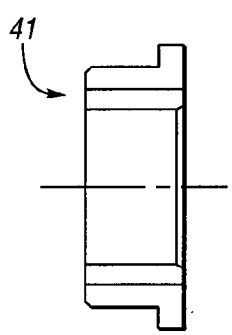
FIG. 4a is a schematic sectional view of the perforated thrust washer of FIG. 2 isolated from the transmission.
Figure 4B:
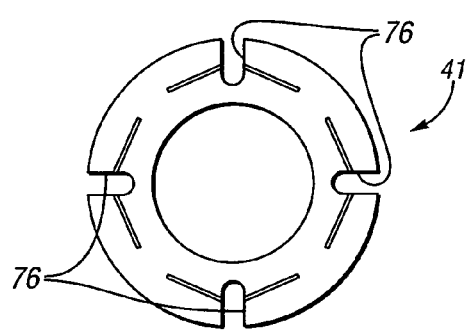
FIG. 4b is a schematic front view of the perforated thrust washer of FIG. 2 isolated from the transmission.

The two circuits (57 and 59) are isolated by a set of rotating seal rings 74 and a steel tube 35 fitted within the input shaft 18 of the transmission 10. A grooved thrust washer 41, as better shown in FIGS. 4a and 4b, facilitates oil travel from the inner diameter of the tube 35 to the damper vessel 34. The thrust washer 41 has grooves 76 in its perimeter to facilitate oil travel through the washer 41 and into the damper vessel 34.

While the best modes for carrying out the invention have been described in detail, those familiar with the art to which this invention relates will recognize various alternative designs and embodiments for practicing the invention within the scope of the appended claims.

The invention claimed is:

1. An electrically variable transmission with at least one electric motor and a rotatable torsional damper assembly, the torsional damper assembly comprising:
   a torsional spring operable to eliminate or reduce compression pulses and torsionals;
   a clutch assembly having a hydraulically operable piston for selectively locking out said torsional spring;
   at least one electric motor operable to cancel out the compression pulses when the torsional spring is locked out; and
   a hydraulic fluid applicable to opposing sides of said piston to sufficiently hydraulically balance said piston so as to prevent the clutch assembly from locking out said torsional spring at least partially in response to the rotational speed of said damper, thereby enabling said torsional spring to eliminate the torsionals.

2. The transmission of claim 1, further comprising:
   an auxiliary pump operable to pump said hydraulic fluid to opposing sides of said piston; wherein said auxiliary pump is drivable by an electric motor.

3. The transmission of claim 1, further comprising:
   a main pump operable to pump said hydraulic fluid to one side of said piston.

4. The transmission of claim 1, wherein said torsional spring and said clutch assembly are enclosed by a transmission side cover and an engine side cover; said transmission side cover and said engine side cover defining a vessel on one side of said piston configurable to receive said hydraulic fluid.

5. The transmission of claim 1, further comprising:
   an input shaft configured to receive said hydraulic fluid; and
   a thrust washer fitted to one end of said input shaft; said thrust washer having grooves enabling said thrust washer to facilitate guiding said hydraulic fluid from said input shaft and to one side of said piston.

6. The transmission of claim 5, further comprising:
   a tube fined within said inner diameter of said input shaft; said tube operable to separate said hydraulic fluid in said input shaft.

7. The transmission of claim 1, further comprising:
   a damper flange and damper hub to which said clutch assembly and said piston are securable, said damper flange and damper hub at least partially defining a channel operable to receive said hydraulic fluid on another side of said piston.

8. A powertrain having an engine generating compression pulses and torsionals; and an electrically variable transmission with at least one electric motor having a hydraulically actuable torsional damper assembly, comprising:

an engine side cover secured to the engine;
a damper flange commonly securable to said engine side cover and a damper hub;
wherein said damper hub is securable to an input shaft in said electrically variable transmission; and wherein said damper flange has a damper spring enabling the torsional damper assembly to absorb such engine torsionals and compression pulses;
a transmission side cover secured to the engine side cover and configured to at least partially enclose said damper flange;
wherein said transmission side cover and said engine side cover further define a vessel enclosing said damper flange and said damper spring;
wherein said damper flange and said transmission side cover encloses selectively energizeable clutch plates for locking out said damper springs; and
at least one electric motor in the electrically variable transmission to selectively cancel the engine compression pulses.

9. The vehicle of claim 8, further comprising:
a piston operable to affect the selective engagement of said clutch plates so that said damper springs are locked out;
a hydraulic circuit, including:
a main pump drivable by the engine and operable to pump a hydraulic fluid to opposing sides of said piston; and
an auxiliary pump drivable by an electric motor and operable to pump said hydraulic fluid to opposing sides of said piston.

10. The vehicle of claim 9, wherein said damper flange at least partially defines a piston cavity abutting one side of said piston and configurable to receive said hydraulic fluid; and
wherein said damper flange partially defines a channel operative to guide said hydraulic fluid into said piston cavity.

11. The vehicle of claim 10, further comprising:
an input shaft defining radially extending apertures operative to guide said hydraulic fluid from an inner diameter of said input shaft to an outer diameter of said input shaft; and into said channel of said damper flange.

12. The vehicle of claim 11, further comprising:
a thrust washer fittable to one end of said input shaft; said thrust washer having grooves enabling said thrust washer to facilitate guiding said hydraulic fluid from said input shaft and to another side of said piston.

13. The transmission of claim 12, further comprising:
a tube fitted within said inner diameter of said input shaft; said tube operable to separate said hydraulic fluid received in said input shaft.

14. The vehicle of claim 13, wherein said main pump is configured to pump said hydraulic fluid to a control module and a main regulator;
wherein said control module is configured to guide hydraulic fluid to one side of said piston;
wherein said main regulator is configured to guide hydraulic fluid to a priority regulator;
wherein said priority regulator guides said hydraulic fluid to a thermal exchanger, said thermal exchanger operative to guide said hydraulic fluid to a lube regulator; and
wherein said lube regulator is operable to guide said hydraulic fluid to said another side of said piston.

15. The vehicle of claim 14, wherein said tube regulator is configured to guide said hydraulic fluid to said tube, through said thrust washer and to said another side of said piston; and
wherein said control module is configured to guide said hydraulic fluid between said input shaft and said tube, through said radially extending apertures, onto said channel, and to said one side of said piston.

16. A method of operating a rotatable hydraulically actuated torsional damper of an electrically variable transmission in the start, stop and drive modes, comprising:
hydraulically locking out said torsional damper during the start and stop modes in response to a hydraulic fluid; and
hydraulically counter balancing said hydraulic fluid to prevent said hydraulically locking out of said torsional damper during drive mode.

17. The method of claim 16, further comprising:
pumping said hydraulic fluid from a motor driven auxiliary pump to hydraulically lock out said torsional damper.

18. The method of claim 17, further comprising:
pumping said hydraulic fluid from a main pump and/or an auxiliary pump to hydraulically counter balance said torsional damper.

* * * * *